Nov. 5, 1940.    L. F. HEMPHILL    2,220,763
SPEED REGULATOR
Filed June 8, 1937
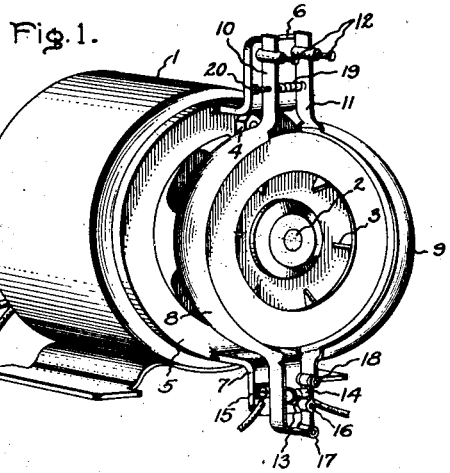
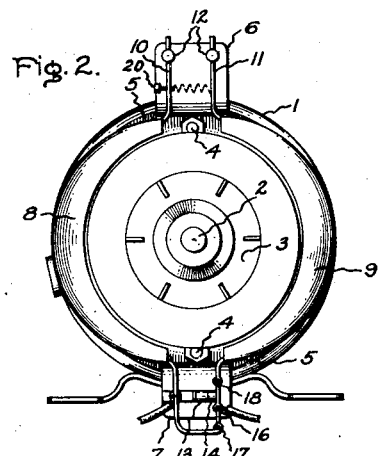
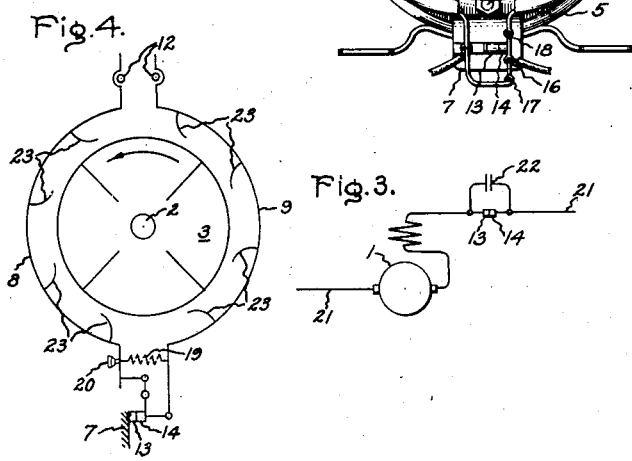
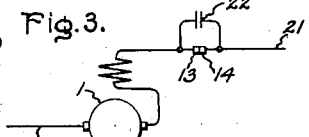
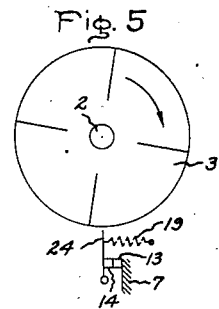
Inventor:
Lawrence F. Hemphill,
by Harry E. Dunham
His Attorney.

Patented Nov. 5, 1940

2,220,763

UNITED STATES PATENT OFFICE 2,220,763

SPEED REGULATOR

Lawrence F. Hemphill, Fort Wayne, Ind., assignor to General Electric Company, a corporation of New York Application June 8, 1937, Serial No. 147,048

20 Claims. (Cl. 200—81)

My invention relates to speed regulators and more particularly to a fluid operated speed regulator for electric motors.

I am aware that fluid pressure, and that even air pressure, has been used to control automatically the speed of electric motors. However, previous arrangements of this type with which I am familiar have been either relatively complicated and expensive or have required the development of relatively high fluid pressures for their operation. Usually they have had both of these disadvantages.

In accordance with my invention, I provide a novel and simple speed regulator which operates primarily on the impulse or fluid velocity principle as contrasted with the pressure or so-called reaction principle. The fluid velocities employed may be either the radial or rotational components of a resultant velocity produced by a rotating element or both components may be used. My regulator is suitable for controlling the speed of many kinds of rotatable devices. However, it is particularly adapted to controlling the speed of small electric motors, such for example as fractional horse power series universal motors used for driving household food working devices, calculating machines, sewing machines, moving picture machines, etc.

In one form of my invention, I utilize an expandable casing surrounding the periphery of a fluid agitatable device or centrifugal impeller operated by the rotatable device whose speed is to be regulated. I so arrange the casing that it produces a force for operating the speed controlling means which is substantially proportional to the internal area of the entire casing multiplied by the unit fluid forces developed therein. With such an arrangement, I obtain directly an adequate and relatively large operating force with the production of a relatively low fluid pressure. This low pressure is conducive to quiet operation and even permits the use of an open-ended casing.

An object of my invention is to produce a new and improved speed regulator. Another object of my invention is to provide a simple and inexpensive automatic adjustable speed regulator for electric motors.

My invention will be better understood from the following description taken in connection with the accompanying drawing and its scope will be pointed out in the appended claims.

In the drawing, Fig. 1 is a perspective view of an electric motor equipped with one form of my regulator which utilizes mainly radial fluid velocity; Fig. 2 is an end view of the same; Fig. 3 is a circuit diagram illustrating suitable connections of my invention; Fig. 4 is a modification which has means for adding a rotational fluid velocity effect to the radial fluid velocity effect; and Fig. 5 is another modification which utilizes rotational fluid velocity alone.

Referring now to the drawing, and more particularly to Figs. 1 and 2, the rotatable device whose speed is to be regulated is shown as an electric motor 1 provided with a shaft extension 2 on which is mounted a centrifugal air impeller 3. Mounted on the end of the motor frame concentrically with the shaft extension 2 by means of bolts 4 is a circular frame 5. This frame is provided with integral opposite outwardly extending projections or lugs 6 and 7. Surrounding the impeller 3 is an open-ended outwardly expandable stationary casing composed of inwardly cupped semi-circular sections 8 and 9. These sections are fastened to the frame 5 by means of extensions 10 and 11 inserted in suitable clamps or terminals 12 fastened to the projection 6. Such a mounting is really a resilient mounting and is the equivalent of a pivotal mounting so that the lower or free ends of the sections 8 and 9 move outwardly as the casing expands when air pressure is built up in it by rotation of the impeller 3.

On the lower projection 7 there is mounted a circuit controller in the form of a switch having a fixed contact 13 and a movable contact 14. The fixed contact 13 is provided with a suitable electrical terminal 15 and the movable contact 14 is fastened to an electrical conducting member which is pivotally mounted on a stud or screw 16 fastened to the lower projection 7. Depending extensions on the casing sections 8 and 9 are pivotally or flexibly fastened to the member carrying the movable contacts 14 at 17 and 18 respectively.

By means of a spring 19, the tension of which is adjusted by a screw 20, the casing sections 8 and 9 are urged together thereby normally causing the movable contact to engage the fixed contact.

A suitable form of electrical connections for my invention is shown in Fig. 3 wherein the motor 1 and the contacts 13 and 14 are connected in series in a suitable circuit 21 for energizing the motor 1. A capacitor 22 is preferably connected across the contacts 13, 14 in a conventional manner so as to minimize contact sparking and burning.

In the operation of my invention, the energizing current for the motor in flowing through the contacts 13 and 14, causes the motor to increase its speed thereby causing air which is caught between the blades of the impeller 3 to be thrown radially outward by centrifugal force against the inner surface of the casing sections 8 and 9. This creates velocity impulse force tending to expand the casing and move the sections 8 and 9 outwardly about effective pivots at 12. When the air force gets sufficiently great to overcome the opposing force of the spring 19 the sections 8 and 9 move outwardly and by means of their connection to the member carrying the movable contact 14, this contact is separated from the fixed contact 13. Thereupon the motor circuit is broken and the motor speed decreases, in turn causing a decrease in air force until the spring 19 moves the sections 8 and 9 inwardly until the contacts close again. This cycle is repeated rapidly thereby holding the speed of the motor at an average value which is determined by the setting of the adjusting screw 20. This screw may be turned with the device in operation so that the speed of the motor may be altered at will during the operation.

It will be noted that in my regulator, the working surface upon which the air operates is substantially the entire inner surface area of the casing for the centrifugal impeller. Therefore, as the working area is relatively large, the unit working fluid force need be relatively low in order to obtain an adequately strong operating force for the switch. Furthermore, as the working forces and hence pressures are low the casing need not be closed and, as shown, it is open at both ends. In other fluid pressure regulators with which I am familiar, the casings are closed and relatively high pressures are built up and this relatively high fluid pressure is then transmitted through a relatively small cross-section conduit to a piston or vane having a relatively small working area.

While air is the working fluid of my regulator as I have described it above it will of course be obvious to those skilled in the art that other fluids, either gases or liquids may also be used. For example, if it were desirable to use hydrogen for cooling the motor the entire motor and its regulator could be operated in a hydrogen atmosphere. Similarly, the motor and its regulator may be immersed in any other suitable fluid, whether liquid or gaseous.

The impeller 3 may also be used to draw cooling air through the motor 1 and to blow cooling air on the contacts 13 and 14.

It has previously been stated that fluid such as air which is swept between the blades of the impeller 3 is thrown radially outward by centrifugal force as the impeller rotates. This is true as far as it goes but what actually happens may be more completely described by saying that the impeller imparts to the air a velocity having both radial and rotational components. The rotational component is tangential in the direction of rotation and the resultant velocity of the air as it leaves the impeller is at some intermediate angle between the tangential and the radial direction. In the embodiment of my invention shown in Figs. 1 and 2, it is the radial or what may also be described as the pressure component which mainly actuates the device, and the rotational or what may be described as the velocity component plays very little part in the operation.

In the modification shown in Fig. 4, the rotational component is also utilized by adding it to the radial component. This is done by adding suitably shaped blades 23 to the inner side of the casing sections 8 and 9. These blades are so shaped that their inner edges are substantially parallel to the resultant velocity of the air as it leaves the impeller and they are then curved so as to direct this resultant velocity approximately radially against the casing sections thereby increasing the force for actuating the contacts. While Fig. 4 is shown schematically, it should be understood that except for the blades 23 the construction is similar to that shown in Figs. 1 and 2.

The rotational component of air velocity can also be used solely or as the major operating force. One arrangement for doing this is shown in Fig. 5 wherein the pivotally mounted movable contact 14 is carried by a vane or blade 24 extending radially from the periphery of the impeller 3. When the impeller 3 rotates in the direction as shown by the arrow, the rotational component of air velocity strikes the blade and at a certain speed the reaction will be sufficient to overcome the force of spring 19 and separate the contacts. The regulator will then operate in the manner previously described, except that the radial or pressure component of the air velocity will play little or no part in operating the contacts.

While I have shown and described particular embodiments of my invention, it will be obvious to those skilled in the art that changes and modifications may be made in my invention and I therefore aim in the appended claims to cover all such changes and modifications as fall within the true spirit and scope of my invention.

What I claim as new and desire to secure by Letters Patent of the United States, is:

1. In a speed responsive regulator for a rotatable device, means for controlling the speed of said device, means rotatable by said device for imparting radial and rotational velocity components to a substantially unconfined fluid, and means directly responsive substantially solely to the effect of one of said components for operating said speed controlling means in a manner to maintain the speed of said device substantially constant.

2. In a speed responsive regulator for a rotatable device, means for controlling the speed of said device, means rotatable by said device for imparting radial and rotational velocity components to a substantially unconfined body of air adjacent said motor, and means directly responsive substantially solely to the effect of one of said components for operating said speed controlling means in a manner to maintain the speed of said device substantially constant.

3. In a speed responsive regulator for an electric motor, means for controlling the speed of said motor, means rotatable by said motor for imparting radial and rotational velocity components to a substantially unconfined body of air adjacent said motor, and means directly responsive substantially solely to the effect of one of said components for operating said speed controlling means in a manner to maintain said motor speed substantially constant.

4. In a speed responsive regulator for an electric motor, a switch for controlling the speed of said motor, means rotatable by said motor for imparting radial and rotational velocity components to a substantially unconfined body of air adjacent said motor, and means directly responsive substantially solely to the effect of one of said components for alternately opening and closing said switch in a manner to maintain the average speed of said motor substantially constant.

5. In a speed responsive regulator for a rotatable device, means for controlling the speed of said device, means rotated by said device for imparting to a fluid a velocity having a rotational component as distinguished from a radial velocity component, and means operative solely in response to said rotational component for controlling the operation of said speed controlling means in a manner to maintain the speed of said device substantially constant.

6. In a speed responsive regulator for an electric motor, a switch for controlling the speed of said motor, an air impeller driven by said device for imparting to air adjacent said motor a velocity having a rotational component as distinguished from a radial velocity component movable means having a surface arranged to intercept only the air having said rotational component, said last-mentioned movable means being arranged to operate said switch in a manner to maintain the speed of said motor substantially constant.

7. In a speed responsive regulator for a rotatable device, means for controlling the speed of said device, means rotated by said device for imparting to a fluid a velocity having radial and rotational components, and means responsive to the impulse effect of the sum of both of said components for controlling the operation of said speed controlling means in a manner to maintain the speed of said device substantially constant.

8. In a speed responsive regulator for a rotatable device, means for controlling the speed of said device, a centrifugal fluid agitating element arranged to be rotated by said device, said element imparting to a fluid in which it rotates a resultant velocity having both radial and rotational components, an open-ended outwardly expandable casing surrounding the periphery of said element, said casing being provided with inwardly extending curved blades whose inner edges are substantially parallel to said resultant velocity and whose outer edges are substantially perpendicular to the inner surface of said casing, and means for operating said speed controlling means by the outward motion of substantially the entire surface of said casing, said motion being produced by the impulse effect of the velocity of said fluid against said casing.

9. In a speed responsive regulator for an electric motor, a switch for controlling the speed of said motor, a centrifugal air impeller arranged to be rotated by said motor, a stationary open-ended casing surrounding the periphery of said impeller, said casing being divided transversely into sections, the inner surface of said sections being provided with a pair of blades shaped so that air leaving said impeller continues against said blades at an angle which is substantially zero, said blades being so curved as to direct said air substantially perpendicularly against the inner surface of said casing section, means for anchoring two adjacent ends of said section and means for connecting the free ends of said sections to operate said switch.

10. In a speed responsive regulator for a rotatable device, means for controlling the speed of said device, a centrifugal fluid agitating element arranged to be rotated by said device, an open-ended outwardly expandable casing surrounding the periphery of said element, and means for operating said speed controlling means by the outward expansive motion of substantially the entire surface of said casing.

11. In a speed responsive regulator for an electric motor, a circuit controller for controlling the speed of said motor, a centrifugal air impeller mounted on the shaft of said motor, an outwardly expandable non-rotatable casing surrounding the periphery of said impeller, said casing being subjected to an expansive force substantially equal to the internal surface area thereof multiplied by the unit air force developed thereagainst by said impeller, and means for utilizing substantially all of said force to operate said circuit controller.

12. In a speed responsive regulator for an electric motor, a switch for controlling the speed of said motor, said switch having a fixed contact and a movable contact, a centrifugal air impeller mounted on the shaft of said motor, an open-ended outwardly expandable stationary casing surrounding the periphery of said impeller, said casing being subjected to an expansive force substantially equal to the internal surface area thereof multiplied by the unit air force developed therein by said impeller, and means for using substantially all of said expansive force to operate said movable contact.

13. In a speed responsive regulator for a rotatable device, a fluid agitatable member arranged to be rotated by said device, a peripheral casing for said member, said casing being divided into sections which are movable as a result of centrifugally created fluid force produced by rotation of said member, and means jointly and severally controlled by motion of said sections for controlling the speed of said device.

14. In a speed responsive regulator for a rotatable device, means for controlling the speed of said device, a fluid agitatable member arranged to be rotated by said device, a peripheral casing for said member, said casing being divided transversely into sections, one end each of a plurality of said sections being anchored, means connecting the free end of each of said plurality of sections to operate said means for controlling the speed of said device.

15. In a speed responsive regulator for an electric motor, a switch for controlling the speed of said motor, a centrifugal air impeller arranged to be rotated by said motor, a stationary open-ended casing surrounding the periphery of said impeller, said casing being divided transversely into two sections, means for anchoring two adjacent ends of said sections, and means for connecting the free ends of said sections to operate said switch.

16. In a speed responsive regulator for an electric motor, a centrifugal air impeller mounted on the shaft of said motor, a stationary open-ended casing surrounding the periphery of said impeller, said casing being divided transversely into two sections, means for anchoring two adjacent ends of said sections, a switch in circuit with said motor for controlling the speed thereof, said switch having a fixed contact and a movable contact, means connecting the free ends of said sections to said movable contact in such a way that outward movement of said sections as a result of air forces produced thereon by rotation of said impeller causes said movable contact to separate from said fixed contact, and adjustable means for urging said sections together.

17. In a speed responsive regulator for an electric motor, a circular frame mounted on one end of said motor concentric with an extension of the shaft of said motor, opposite outwardly extending projections on said frame, a centrifugal air impeller mounted on said shaft extension, a pair of inwardly cupped semi-circular members surrounding the periphery of said impeller, said members having extensions fastened to one of said projections and having opposite extensions opposite the other of said projections, a fixed contact on the latter projection, a contact movably mounted on the latter projection, means for connecting said opposite extensions to operate said movable contact, means for urging said members together, and an electric circuit the opening and closing of which controls the speed of said motor having said contacts connected therein.

18. Speed regulating means for an electric motor comprising, in combination, an air impeller rotated by said motor, said rotatable impeller having an output area corresponding to its peripheral area through which air is normally discharged at a relatively high velocity and at substantially atmospheric pressure, means including a switch which when moved from a first position to a second position reduces the speed of said motor and when moved from said second position to said first position increases the speed of said motor, said switch being continuously biased toward said first position, and a movable member mounted directly adjacent said impeller in the direct path of the air discharged by said impeller, the active surface of said member being substantially normal to the direction of said discharge and being of an area at least as great as the discharge area of said impeller, said member being operative to move said switch from said first position to said second position in response to the force of the air impulse thereagainst corresponding to a predetermined motor speed.

19. Speed regulating means for an electric motor comprising, in combination, an air impeller rotated by said motor, said rotatable impeller having a given output area through which air is normally discharged radially throughout substantially a complete circle at a relatively high velocity and at substantially atmospheric pressure, means including a switch which when moved from a first position to a second position reduces the speed of said motor and when moved from said second position to said first position increases the speed of said motor, said switch being continuously biased toward said first position, an expandable ring surrounding said impeller and having its inner surface in the direct path of the air discharged by said impeller, and means controlled by the expansion of said ring for moving said switch from said first position to said second position in response to the force of the air impulse thereagainst corresponding to a predetermined motor speed.

20. Speed regulating means for an electric motor comprising, in combination, an air impeller rotated by said motor, said impeller having an output area corresponding to its peripheral area through which air is normally discharged at a relatively high velocity and at substantially atmospheric pressure, means including a switch which when moved from a first position to a second position reduces the speed of said motor and when moved from said second position to said first position increases the speed of said motor, said switch being continuously biased toward said first position, and a movable member mounted directly adjacent said impeller in the direct path of the air discharged by said impeller, said member being operative to move said switch from said first position to said second position in response to the force of the air impulse thereagainst corresponding to a predetermined motor speed, said air discharge being unconfined at the sides so as to prevent the development of air pressures above atmospheric pressure during operation of said regulating means.

LAWRENCE F. HEMPHILL.